United States Patent [19]

Clark

[11] Patent Number: 4,545,723
[45] Date of Patent: Oct. 8, 1985

[54] APPARATUS FOR ADAPTING AN END EFFECTOR DEVICE REMOTELY CONTROLLED MANIPULATOR ARM

[75] Inventor: Keith H. Clark, Decatur, Ala.

[73] Assignee: The United States of America as represented by the Administrator of the National Aeronautics and Space Administration, Washington, D.C.

[21] Appl. No.: 538,063

[22] Filed: Sep. 30, 1983

[51] Int. Cl.⁴ .............................................. B25J 15/04
[52] U.S. Cl. ..................................... 414/730; 901/31; 901/50
[58] Field of Search .................. 414/4, 5, 1, 729, 730, 414/735, 738; 294/115, 116, 86.4; 901/31, 36–38, 15, 30, 50, 39, 41

[56] References Cited

U.S. PATENT DOCUMENTS

| | | | |
|---|---|---|---|
| 2,034,637 | 3/1936 | Mooney | 294/115 X |
| 2,861,701 | 11/1958 | Bergsland et al. | 901/30 X |
| 3,247,978 | 4/1966 | Neumeier | 901/15 X |
| 4,165,116 | 8/1979 | Baudoin et al. | 294/86.4 |
| 4,370,091 | 1/1983 | Gagliardi | 414/735 |
| 4,488,241 | 12/1984 | Hutchins et al. | 901/31 X |

OTHER PUBLICATIONS

"Mechanical Hand for Gripping Objects", NASA Tech. Briefs, vol. 5, No. 2, 1980, Clark et al., p. 215.

Primary Examiner—Terrance L. Siemens
Attorney, Agent, or Firm—Joseph H. Beumer; John R. Manning; Leon D. Wofford, Jr.

[57] ABSTRACT

Apparatus for adapting a general purpose end effector device (10) to a special purpose end effector (A) is disclosed which includes an adapter bracket assembly (B) which provides a mechanical and electrical interface between the end effector devices. The adapter bracket assembly (B) includes an adapter connector post (46) which interlocks with a diamond-shaped gripping channel (28) formed in closed jaws (18) and (20) of the general purpose end effector (10). The angularly intersecting surfaces of the connector post and gripping channel prevent any relative movement therebetween. Containment webs (42, 44) constrain the outer finger plates (22a, 22b) of the general purpose jaws (18, 20) to prevent pitch motion. Electrical interface is provided by conical, self-aligning electrical connector components (60, 62) carried by respective ones of said end effectors (A, 10).

16 Claims, 4 Drawing Figures

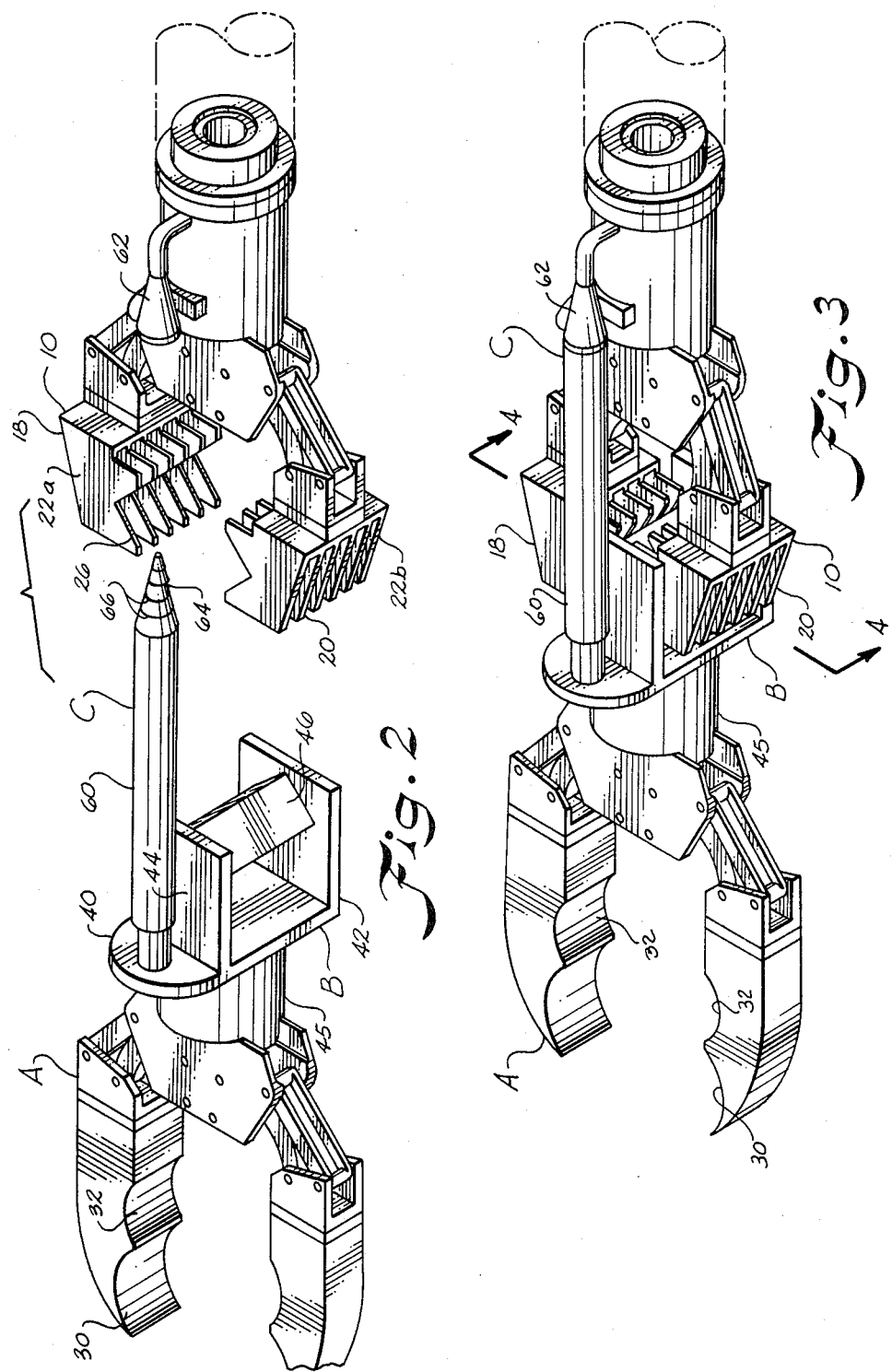

APPARATUS FOR ADAPTING AN END EFFECTOR DEVICE REMOTELY CONTROLLED MANIPULATOR ARM

ORIGIN OF THE INVENTION

The invention described herein was made by an employee of the U.S. Government and may be manufactured and used by or for the Government for government purposes without the payment of any royalties thereon or therefor.

BACKGROUND OF THE INVENTION

The invention relates to end effector devices for a mechanical manipulator arm on a space vehicle which performs work in space or in any application where work must be performed mechanically from a remote location.

Prior utilization of remote control manipulator arms are shown in U.S. Pat. Nos. 3,401,903 and 3,268,091. However, the utilization of these devices is limited because their design does not provide positive gripping of a wide variety of object sizes and shapes.

Meshing type jaw teeth have been known for gripping different sizes of objects such as shown in U.S. Pat. No. 1,025,725. However, none of these devices are practical for precision use in gripping objects with a remotely controlled manipulator arm.

Generally gripping jaws have been provided with V-shaped notches which form an open or closed diamond-shaped gripping channel when the gripping jaws are brought together such as in U.S. Pat. No. 4,068,763. End effector devices with V-shaped channel notches have been heretofore proposed in which each gripping jaw comprises a number of spaced individual finger plates. The finger plates of one jaw are offset with respect to the finger plates of the other jaw so that they intermesh with each other and a variably sized diamond-shaped gripping channel is provided. This results in a general purpose end effector device which may be used for gripping a variety of object sizes and shapes. While this general purpose end effector device is useful for many tasks in space, there are many applications in space which require specialized end tools.

The general purpose end effector devices cannot sufficiently perform many of the specialized jobs in space. Changing the general purpose end effector device to a specialized end effector device in space is difficult.

Accordingly, an important object of the present invention is to provide apparatus for adapting a general purpose end effector device to a specialized end effector device.

Another important object is to provide a means for changing out end effector devices rapidly and remotely in space without need of bolts, screws, or other conventional fastening devices.

Yet another important object of the present invention is to provide apparatus for adapting a general purpose end effector device to interface with a special purpose end effector device mechanically, electrically, and remotely in a rapid manner.

SUMMARY OF THE INVENTION

The above objectives are accomplished according to the present invention by providing an adapter bracket assembly which interfaces both mechanically and electrically with a general purpose end effector device. The adapter bracket assembly carries a special purpose end effector to perform a specialized task. A wide variety of specialized end effectors may be provided to perform specialized tasks. Each specialized end effector is mounted on an adapter bracket assembly for mechanical and electrical interface with the general purpose end effector. For example, the special purpose end effector may be a motorized drill, a specialized set of gripping jaws, an electromagnetic hammer, a camera, or any other specialized tool needed to perform a specialized task in space.

In accordance with the invention, a unique adapter bracket assembly is provided which includes a base plate carrying the specialized end effector tool. A pair of vertically spaced apart containment webs are provided extending outwardly from the base plate. An adapter connector post extends between the first and second containment webs. The connector post has four intersecting surfaces which intersect one another at sharp angles which complement and correspond to the intersecting angles of the surfaces of the diamond-shaped channel formed by the meshing fingers of the general purpose gripping jaws. Relative rotation between the special purpose end effector and general purpose end effector is effectively prevented. The containment webs are dimensioned to contain the top and bottom finger plates of the gripping jaws of the general purpose end effector and restrain any relative vertical movement so that the two end effector devices are joined as one piece. Male and female self-aligning electrical connector components are carried on respective ones of the adapter bracket assembly and general purpose end effector such that electrical interface may be had between the two end effectors as well as a rigid mechanical connection and interface.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIG. 2 is a perspective view illustrating apparatus for mechanically and electrically interfacing a special purpose end effector device and general purpose end effector device according to the invention;

FIG. 3 is a perspective view illustrating apparatus according to the invention for adapting a general purpose end effector device.

DESCRIPTION OF A PREFERRED EMBODIMENT

Apparatus is disclosed for adapting a general purpose end effector device carried at a free end of a remotely controlled manipulator arm to a special purpose end effector device having capabilities for performing specialized tasks and maneuvers in space. A general purpose end effector device is illustrated which includes first and second pivotal jaws disposed in spaced relation to one another. First and second channel notches are formed in the first and second jaws defined by planar intersecting edges intersecting one another at defined sharp angles. The first and second channel notches form a diamond-shaped channel. A special purpose end effector device is illustrated at A in FIG. 2 which includes a specialized tool or end effector for performing a specialized task. An adaper bracket assembly B is provided for adapting the special purpose end effector device to the general purpose end effector device so that mechanical and electrical interfacing may be had therebetween. The adapter bracket B has a base plate which carries a special purpose end effector. First and second spaced containment webs extend from the base plate and an adapter connecting post extends between the containment webs which is spaced from the base plate. The connector post has planar intersecting surfaces which intersect at complementary angles which correspond to the angles of intersection of the closed channel surfaces when the gripping jaws are closed about the post. This prevents relative rotation between the special and general purpose end effectors. The gripping jaws of the general purpose end effector are contained between the first and second containment webs to effectively prevent any pitch motion between the two interfaced end effector devices whereby they are mechanically joined together as one piece. An electrical interfacing component C is provided whereby the end effector devices are interfaced electrically when joined together mechanically.

Figure 1:
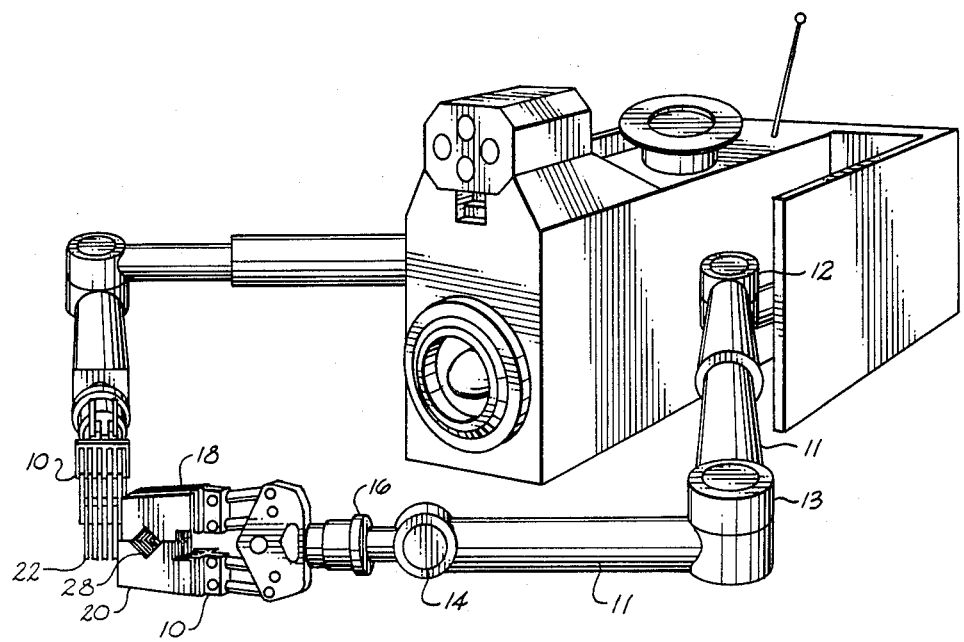
FIG. 1 is a perspective view of a teleoperator orbiting space vehicle having remotely controlled manipulator arms with general purpose end effector devices.
Figure 4:
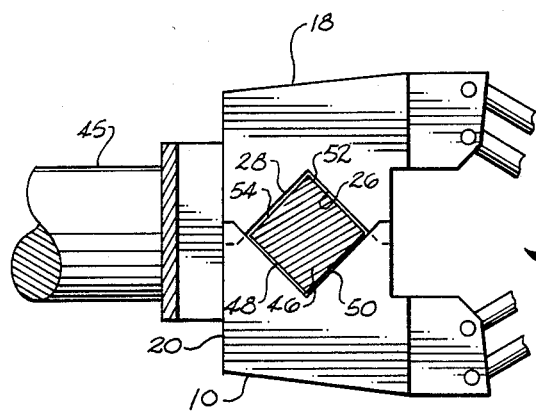
FIG. 4 is a top view illustrating the mechanical connection between a general purpose end effector device and an adapter bracket assembly according to the invention.

Referring now in more detail to the drawings, the general purpose end effector device 10 is illustrated in FIG. 1 in connection with a space vehicle which includes a manipulator arm 11, a shoulder joint 12, an elbow joint 13, and a wrist joint designated generally as 14. The wrist joints and elbow joints and shoulder joints are typically rotated by means of electric motors within the joints which are remotely controlled. The illustrated vehicle is typically of the family of vehicles known as tele-operator orbiting vehicles. Since the details of motor drives and controls for manipulator arms are well known and do not form any part of the invention herein, such details are not included. However, reference may be had to U.S. Pat. No. 3,268,091 which discloses in more detail the drive mechanisms and controls.

The general purpose end effector device 10 is connected to the mechanical wrist joint 14 by means of a coupling 16 and includes a pair of identical movable jaws 18 and 20 disposed in opposed relation for gripping an object. Each jaw is provided with a plurality of spaced-apart finger plates 22. Each finger plate 22 has a notch 26 (FIG. 2) formed therein which forms a gripping channel in the jaw. As illustrated, the notch is generally V-shaped, opening outwardly and tapering inwardly to an apex portion wherein the planar V sides intersect at a defined sharp angle. Gripping plates 22a (FIG. 2) are offset with respect to the finger plates 22b of the opposing jaws to permit the finger plates to intermesh between one another and provide a variably closed channel 28 to grip different size objects.

Referring now in more detail to the invention, the specialized end effector A is illustrated as a pair of gripping jaws which have scalloped gripping faces at 30 and 32. The illustrated specialized end effector is used for a specialized task of picking up different size bundles of tubing in space. It is to be understood, of course, that other specialized tools and end effectors may also be utilized within the scope of the present invention and interfaced with the general purpose end effector both mechanically and electrically by means of the adapter bracket assembly disclosed herein. For example, an electro/magnetic hammer, a drill motor, a camera, or like specialized tools may be carried by the adapter bracket assembly B interfaced with the general purpose end effector 10.

The adapter bracket assembly B includes a base plate 40 and a pair of spaced apart containment webs 42 and 44 cantilevered and extending outwardly from the base plate. There is an adapter connecting post 46 extending between the containment webs 44 and 42. The interconnecting post 46 includes intersecting planar surfaces 48, 50, 52, and 54. The planar surfaces of the connecting post intersect at sharp complementary angles which correspond to the angles of the gripping channel of the general purpose end effector as defined by the planar intersecting surfaces of notches 26. When the gripping jaws 18 and 20 are closed upon the post, the intersecting surfaces of the post and closed gripping channel prevent relative rotation between the special purpose and general purpose end effectors.

The containment webs 44 and 42 are dimensioned such that the top and bottom plates 22a and 22b of the gripping jaws fit precisely between the containment webs 42 and 44 such that there is no relative vertical movement, and hence pitch motion, between the end effector devices. Thus, by means of the adapter bracket assembly the end effector devices are mechanically joined in a generally rigid manner as one piece.

The electrical interface means C, as illustrated in FIGS. 2 and 3, includes a first electrical component 60 carried by the adapter bracket assembly B and a second electrical connector component 62 carried by the manipulator arm at the general purpose end effector. It is preferred that the electrical interface means C includes conically shaped male and female connectors such that they are self-aligning when being connected. As the gripping jaws 18 and 20 close about post 46 the surface of the gripping channel gradually pull the post into a centered position in the channel resulting in gradual alignment and connection between the male and female conical connectors. Any suitable male and female connectors may be utilized such as that disclosed in application Ser. No. 432,057 filed on Sept. 30, 1982, now U.S. Pat. No. 4,421,371, issued Dec. 20, 1983, by the same inventor which disclosure is hereby incorporated herein. The first electrical connector component 60 includes a male conical member 64 having electrical contacts at 66 which mate with corresponding electrical contacts in the female receptacle component 62 so as to transmit electrical signals to the specialized end effector. The electrical connector component 62 is connected to a source of electrical transmission so the signals are transmitted to the specialized end effector A for controlling the jaws in the example illustrated. When the specialized end effector is another form such as a drill the electrical signal transmitted thereto will be made accordingly and controlled.

Thus, it can be seen that a highly advantageous apparatus for adapting and converting a general purpose end effector to a specialized end effector device may be had in accordance with the present invention where mechanical and electrical interfacing may be had remotely in a rapid manner.

While a preferred embodiment of the invention has been described using specific terms, such description is for illustrative purposes only, and it is to be understood that changes and variations may be made without departing from the spirit or scope of the following claims.

What is claimed is:

1. Apparatus for adapting a general purpose end effector device carried at a free end of a remotely controlled mechanical manipulator arm to a special purpose end effector device, said apparatus comprising:
   (a) said general purpose end effector device including first and second pivotable jaws disposed in spaced opposed relation;
   (b) first and second channel notches formed in said first and second jaws defined by planar intersecting edges intersecting one another at defined sharp angles;
   (c) said first and second channel notches forming a closed channel when said first and second jaws are closed together having a four-sided generally diamond-shaped configuration;
   (d) said special purpose end effector device comprising an end effector device for performing a specialized task;
   (e) an adapter bracket assembly for electrically and mechanically connecting said special purpose end effector to said general purpose end effector comprising:
      (i) an adapter bracket having a base plate on which said special purpose end effector is carried,
      (ii) first and second spaced containment webs extending from said base plate,
      (iii) a connecting post extending between said first and second containment webs spaced from said base plate,
      (iv) said post having surfaces intersecting each other at complementary angles corresponding to the angles of intersection of said surface of said closed channel when gripped by said jaws to prevent relative rotation between said special and general purpose end effector when connected together, and
      (v) said first and second containment web means containing said gripping jaws to effectively prevent relative vertical movement between said special purpose and general purpose end effector devices,
      whereby said special purpose and general purpose end effector devices are connected mechanically together as one piece;
   (f) a first self-aligning electrical connector component carried by said adapter bracket assembly for delivering electrical transmissions to said special purpose end effector; and
   (g) a second self-aligning electrical connector carried by said general purpose end effector which self-aligns and connects with said first connector component when said end effector devices are mechanically connected together by said adapter bracket, said second connector component adapted for connection to a source of said electrical transmissions.

2. The apparatus of claim 1 wherein one of said electrical connector components include a conical shaped female electrical receptacle and the other of said electrical connector components includes a complementary shaped male conical connector which is received in said female receptacle, said male and female connector components being aligned and pulled together during closure of said gripping jaws about said connector post.

3. The apparatus of claim 1 wherein each of said first and second gripping jaws of said general purpose end effector includes:
   (a) a plurality of gripping fingers defined by a plurality of spaced apart finger plates wherein the finger plates of one of said jaws are offset with respect to the finger plates of the other of said jaws so that said finger plates intermesh between one another and define a variably closed channel; and
   (b) said channel notch of said first and second jaws being defined by a notch formed in the face of each said finger plate whereby said finger plates intermesh with one another to positively grip said adapter connector post.

4. The apparatus of claim 1 wherein said adapter bracket connecting post has a generally square cross-section.

5. Apparatus for adapting a general purpose end effector device carried at a free end of a mechanical manipulator arm to a special purpose end effector device for performing a specialized task, said general purpose end effector device being of the type having first and second movable jaws disposed in spaced apart relation, each said jaw including a plurality of spaced-apart finger plates with the finger plates of the first jaw being offset with respect to the finger plates of said second jaw so that said finger plates intermesh between each other when said first and second jaws are closed together, a notch formed in the finger plates of said first and second jaws defining a gripping channel in said first and second jaws in which an object may be received for gripping, said intermeshing fingers defining a closed channel having a multi-sided configuration wherein the sides intersect each other at defined sharp angles, said apparatus comprising:
   (a) a special purpose end effector device which includes a specialized end effector for performing a specialized task;
   (b) an adapter bracket assembly to which said specialized end effector is carried for electrically and mechanically connecting said special purpose end effector to said general purpose end effector;
   (c) an adapter bracket included in said adapter bracket assembly having a base plate which carries said special purpose end effector;
   (d) first and second spaced-apart containment web means extending from said base plate;
   (e) an adapter connector post extending between said first and second containment web means spaced from said base plate;
   (f) said adapter connector post having surfaces intersecting each other at complementary angles corresponding to the angles of intersection of said surface of said closed gripping channel defined by said first and second jaws of said general purpose end effector closing together;
   (g) said corresponding intersecting surfaces of said connector post and closed channel preventing relative rotation between said special purpose end effector and general purpose end effector when connected together;
   (h) said first and second containment web means effectively containing said first and second gripping jaws of said general purpose end effector when closed about said connector post to effectively prevent any relative vertical movement between said special purpose end effector and general purpose end effector when connected together so that said end effectors are connected together mechanically as one piece;

(i) a first self-aligning electrical connector component carried by said adapter assembly bracket for delivering electrical transmissions to said special purpose end effector;

(j) a second self-aligning electrical connector component carried by said general purpose end effector which self-aligns and connects with said first connector component when said end effector devices are connected together by said adapter bracket; and (k) said second electrical connector component being adapted for connection to a source of said electrical transmissions;

whereby said general purpose end effector and special purpose end effector are mechanically and electrically connected together.

6. The apparatus of claim 5 wherein one of said electrical connector components includes a conical shaped female electrical receptacle and the other of said electrical connector components includes a complementary shaped male conical member which is received in said female member, said male and female connector components being aligned and pulled together during gripping of said connector post so the connector components are gradually joined together in alignment.

7. The apparatus of claim 5 wherein said adapter bracket connecting post has a generally square cross-section.

8. The apparatus of claim 5 wherein said channel notches are formed in each gripping jaw are defined by a pair of planar intersecting surface such that said closed channel defined by said gripping jaws coming together has a generally four-sided diamond-shaped configuration, and said adapter connector post has a corresponding four-sided diamond-shaped cross-section such that the surfaces of said post interlock with said surface of said closed channel when closed thereabout.

9. The apparatus of claim 8 wherein said connector post and closed channel of said gripping jaws have a generally square cross-sectional shaped configuration.

10. The apparatus of claim 5 wherein said containment web means include first and second plates extending perpendicular to said base plate of said adapter bracket, said first and second plates being spaced apart a dimension generally equal to the distance between the top and bottom finger plates of said first and second jaws such that the top and bottom finger plates fit between said first and second web plates in close tolerances.

11. End effector apparatus for a remotely controlled mechanical manipulator arm comprising:

a general purpose end effector disposed at the free end of said arm and having a pair of pivotable intermeshing jaws for grasping objects therebetween;

a first electrical plug carried by said arm in axial alinement with the outermost portion of the arm and having its engageable end facing outward; and an adapter bracket assembly for providing mechanical and electrical connection of said general purpose end effector to a special purpose end effector comprising:

a support member adapted to carry said special purpose end effector;

a graspable post fixedly attached to said support member and having a generally square cross section; said post being adapted to be received by said jaws, a second electrical plug matable with said first plug and mounted on said support member in a location such that said plugs may become connected with one another upon bringing the arm end and graspable post together into a position enabling engagement of said jaws;

said jaws having notches forming a closed channel tightly receiving said post when the jaws are closed.

12. The apparatus of claim 11 a pair of webs supporting the respective ends of said post and blocking movement of the jaws along the post when the jaws are closed.

13. The apparatus of claim 12 wherein one of said plugs has a conical projecting nose and the other has a conical cavity adapted to receive the nose, so that electrical connection may be made therebetween without precise alignment of the plugs with one another.

14. The apparatus of claim 13 wherein said support member includes a base plate disposed generally parallel to said post and normal to the webs supporting the ends of said post.

15. The apparatus of claim 14 wherein said second electrical plug is supported by a straight projecting member connected to said base plate and disposed perpendicular thereto, the plug so supported extending past the jaws when the graspable member and jaws are brought together for engagement.

16. The apparatus of claim 15 wherein said first plug is disposed on said arm end in a position such that when said post is alined for movement together of said arm and said post so as to enable closing of the jaws thereon said plugs are brought into engagement with one another.

* * * * *